US009048617B2

(12) United States Patent
Zweiback et al.

(10) Patent No.: US 9,048,617 B2
(45) Date of Patent: Jun. 2, 2015

(54) METAL VAPOR CIRCULATING SYSTEM

(71) Applicant: Logos Technologies, Inc., Arlington, VA (US)

(72) Inventors: Jason Zweiback, Diablo, CA (US); Claudio Filippone, College Park, MD (US)

(73) Assignee: Logos Technologies, LLC, Fairfax, VA (US)

( * ) Notice: Subject to any disclaimer, the term of this patent is extended or adjusted under 35 U.S.C. 154(b) by 0 days.

(21) Appl. No.: 13/940,185

(22) Filed: Jul. 11, 2013

(65) Prior Publication Data

US 2014/0023100 A1    Jan. 23, 2014

Related U.S. Application Data

(60) Provisional application No. 61/670,344, filed on Jul. 11, 2012.

(51) Int. Cl.
| | |
|---|---|
| *H01S 3/22* | (2006.01) |
| *H01S 3/227* | (2006.01) |
| *H01S 3/041* | (2006.01) |
| *H01S 3/0941* | (2006.01) |
| *H01S 3/03* | (2006.01) |
| *H01S 3/104* | (2006.01) |
| *H01S 3/036* | (2006.01) |

(52) U.S. Cl.
CPC ................. *H01S 3/041* (2013.01); *H01S 3/227* (2013.01); *H01S 3/0941* (2013.01); *H01S 3/031* (2013.01); *H01S 3/0315* (2013.01); *H01S 3/104* (2013.01); *H01S 3/03* (2013.01); *H01S 3/036* (2013.01)

(58) Field of Classification Search
CPC ......... H01S 3/031; H01S 3/036; H01S 3/041; H01S 3/0941; H01S 3/227; H01S 3/03; H01S 3/0315
USPC ................................................ 372/56, 58, 59
See application file for complete search history.

(56) References Cited

U.S. PATENT DOCUMENTS

| 4,641,316 A * | 2/1987 | Collins et al. ................ 372/74 |
| 2009/0022201 A1* | 1/2009 | Krupke et al. ................ 372/75 |

* cited by examiner

*Primary Examiner* — Yuanda Zhang
*Assistant Examiner* — Michael Carter
(74) *Attorney, Agent, or Firm* — David P. Gloekler; Olive Law Group, PLLC

(57) ABSTRACT

A system for circulating an alkali vapor to operate as, for example, a gain medium in a diode pumped alkali laser. The system includes a pump configured to pump a buffer gas to a metal source. A source heat exchanger heats the alkali metal source to produce a metal vapor that flows with the buffer gas. An action chamber receives the metal vapor and buffer gas combination and contains the combination while the metal vapor performs its required functions. The metal vapor and buffer combination continue to flow to a metal vapor trap and heat exchanger that cools the metal vapor and buffer gas combination. The metal vapor trap collects alkali metal condensate as the combination cools. The diffuser transport channel provides an inflow of clean buffer gas to the pump. The pump provides a circulating gas flow through the closed loop system.

30 Claims, 8 Drawing Sheets

METAL VAPOR CIRCULATING SYSTEM

RELATED APPLICATIONS

This application claims priority to provisional patent application U.S. App. Ser. No. 61/670,344 titled "Apparatus and Related Methods for Protecting Optical Windows in Alkali Vapor Lasers," by Jason Zweiback and Claudio Filippone, filed on Jul. 11, 2012, which is incorporated herein by reference.

TECHNICAL FIELD

The present invention relates generally to systems that use metal vapors, and more particularly, to systems and methods for circulating a metal vapor for use in a system or apparatus, such as a diode-pumped alkali laser. Example implementations of the invention are described in the context of alkali lasers. However, other example implementations of a metal vapor circulating system may be advantageously used in other applications including, for example, and without limitation, metal (non-alkali) vapor lasers, test systems for testing metal vapor characteristics, and scientific research systems that utilize metal vapors.

BACKGROUND

Diode pumped alkali lasers (DPAL) are a rather recent development in laser technology. The first DPALs were suggested and demonstrated about a decade ago. Over this time, the average power produced from DPALs has increased from milliwatts to more than 200 W. Initial experiments were all performed in static systems. As the system power increased, DPALs were considered for potential use in DPAL-based weapon systems. The heat generated in the gain medium became a significant problem as the power capability of DPALs increased.

One solution for removing heat in high power DPALs is to flow the gas gain medium. However, a gas flow system in applications involving alkali metals is complicated. One problem is material compatibility: alkali metals are highly reactive and the appropriate materials must be used for all parts of the system. This eliminates using many types of lubricants and elastomeric materials. In addition to reactivity, alkalis can alloy with certain metals, such as gold (a common component of brazing compounds), and then transport the metal throughout the system. This can lead to problems when the alloys become contaminants that are deposited on the optical windows of the laser. A DPAL system uses optically transparent windows, which undergo a high level of optical irradiation. The continued deposition of contaminants on the windows may eventually result in optical damage and failure.

In addition to the compatibility issues, gas flow systems involving alkali vapors have required very careful thermal control throughout the system. The alkali pressure is given by the vapor pressure of the liquid at the operating temperature. The alkali metal will seek out the coldest region in the system and condense there. The temperature at this spot will determine the overall system pressure. An unexpected cold spot can lower the alkali pressure by many orders of magnitude since the temperature-vapor pressure relation is highly non-linear.

Known closed alkali flow systems run the entire system at high temperature. If all of the components are at an elevated temperature, there is no concern over alkali condensing within the flow system. Such systems contain an alkali reservoir maintained at a temperature that is lower than the rest of the system. This temperature determines the alkali density within the overall flow system. However, operating at high temperature causes additional problems. In general, the helium pump is a high speed piece of rotating machinery. High temperature and alkali metals may make the rotor and bearing engineering difficult. The complex nature of the pump may make it difficult to ensure that a system cold spot does not reside inside of the pump. Highly engineered bearings are typically needed in order to provide proper support and stability to the rotor. These bearings have tight tolerances and limited temperature ranges under which they will operate. High temperature operation may lead to excessive wear and premature failure.

Another problem with DPAL systems is the degradation of the optical windows due to reaction with the alkali metals. Even if the window is made of robust materials, such as sapphire, operation under intense laser irradiation can result in damaged windows when exposed to alkali vapors. While the exact causes are still under investigation, chemisorption of the alkali on to the surface of the window appears to play an important role. Studies have demonstrated that internal gas curtains, consisting of a thin layer of pure helium between the optical window and alkali vapor, mitigate this problem. Gas flow systems that use gas curtains typically employ a blow-down design, which is an open system in which the gas that flows in the laser head is exhausted. Pure helium is introduced from outside of the flow system, which would be difficult to do in a closed loop since it would require removal of an amount of gas equal to the amount of helium introduced into the system. On the other hand, closed loop system are especially desirable for compact airborne systems since they do not require a large supply of gas and the associated high pressure cylinders, which are large and heavy.

In view of the foregoing, there is an ongoing need for systems and methods for flowing alkali vapors in a closed loop. in a way that would permit the use of an inert gas to protect optical windows using gas curtains.

SUMMARY

In view of the above, a system for circulating a metal vapor is provided to operate as, for example, a gain medium in a diode pumped alkali laser. The system includes a pump configured to pump a buffer gas through an infuser transport channel to an alkali metal source. A source heat exchanger heats the alkali metal source to produce an alkali vapor that flows with the buffer gas in the infuser transport channel. An action chamber receives the alkali vapor and buffer gas combination from the infuser transport channel for a function that uses the alkali vapor. In a diode-pumped alkali laser, the alkali vapor function is that of a gain medium. The alkali vapor and buffer gas combination continue to flow from the action chamber into a diffuser transport channel. A metal vapor trap heat exchanger cools the alkali vapor and buffer gas combination flowing in the diffuser transport channel. A metal vapor trap is disposed in the diffuser transport channel in thermal proximity to the metal vapor trap heat exchanger. The metal vapor trap collects alkali metal condensate as the alkali vapor and buffer gas combination is cooled. The diffuser transport channel extends beyond the metal vapor trap to provide an inflow of buffer gas without alkali vapor to the pump. The pump provides a circulating gas flow through the infuser transport channel, the action chamber, and the diffuser transport channel as a closed-loop vapor cycle.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, reference numerals designate corresponding parts throughout the different views.

DETAILED DESCRIPTION

Examples of a closed-loop vapor circulating system are described below in the context of the use of the system in an alkali laser, such as a diode-pumped alkali laser (DPAL). The examples of vapor-circulating systems may however be used in any application that uses metal vapors. The description below also focuses on the use of alkali metal vapors to describe examples of implementations. Non-alkali metal vapors may also be used in example implementations. Those of ordinary skill in the art will understand that there is no intent to limit the scope of the invention to DPALs.

As used in the description below, the term "pump" shall refer to any compressor or compressing device, such as a blower, fan, or other gas flow inducing device.

As used in the description below, the term "heat exchanger" shall refer to any suitable thermal energy transfer mechanism whether by heating, cooling, or making localized pressure modifications.

Figure 1:
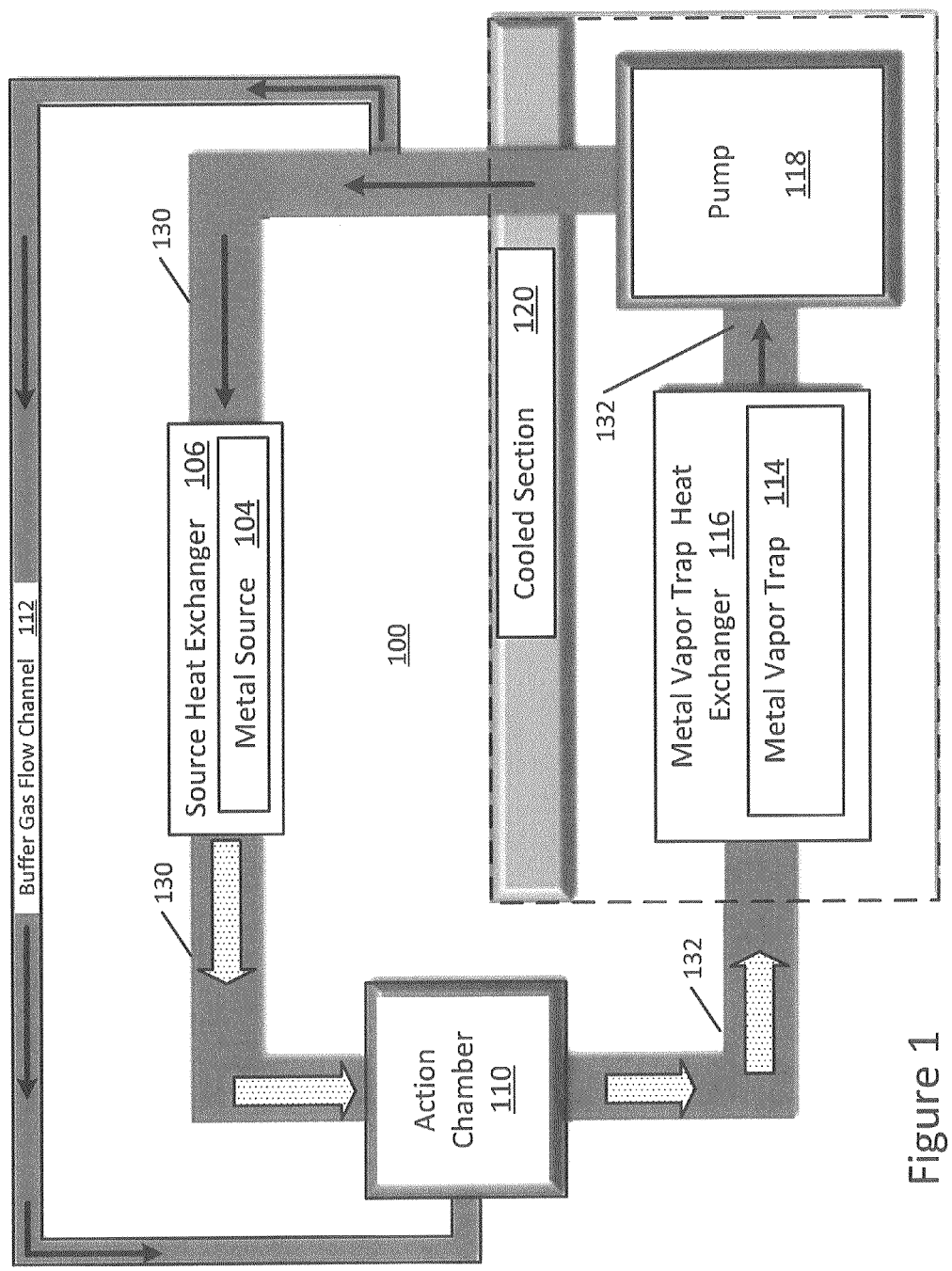
FIG. 1 is a block diagram illustrating operation of an example of a closed-loop alkali vapor circulating system.

FIG. 1 is a block diagram illustrating operation of an example of a closed-loop metal vapor (e.g., alkali metal vapory) circulating system 100. The system 100 includes an alkali metal source 104 in thermal proximity to a source heat exchanger 106. A pump 118 is provided to pump a buffer gas through an infuser transport channel 130 at a flow rate that is selected to provide the flow of gas throughout the vapor circulating system 100. The alkali metal source 104 is disposed in the infuser transport channel 130 to expose the alkali metal to the buffer gas. The source heat exchanger 106 is thermally coupled with the alkali metal source 104 to produce an alkali vapor, which combines with the buffer gas flowing through the infuser transport channel 130. The alkali vapor and buffer gas combination flows through the infuser transport channel 130 towards an action chamber 110.

The action chamber 110 may be any container or vessel that contains the alkali vapor while the alkali vapor is used to effect some desired physical action. As described below with reference to FIGS. 2-7, the action chamber 110 may be an alkali laser head of a DPAL. The action chamber 110 receives the alkali vapor and buffer gas combination from the infuser transport channel 130 for its designated function using the alkali vapor. The alkali vapor and buffer gas combination then flows into a diffuser transport channel 132.

The diffuser transport channel 132 conducts the alkali vapor and buffer gas combination away from the action chamber 110 towards a cooled section 120 of the cycle. The cooled section 120 comprises a metal vapor trap heat exchanger 116 in the diffuser transport channel 132 to transfer thermal energy from the alkali vapor and buffer gas combination flowing in the diffuser transport channel 132. A metal vapor trap 114 is provided in the diffuser transport channel 132 in thermal proximity to the metal vapor trap heat exchanger 116. The metal vapor trap 114 collects alkali metal condensate as the alkali vapor and buffer gas combination is cooled. The diffuser transport channel 132 extends beyond the metal vapor trap 114 to provide an inflow of buffer gas without alkali vapor to the pump 118. The pump 118 is configured to provide a circulating gas flow through the infuser transport channel 130, the action chamber 110, and the diffuser transport channel 132. The pump 118 is configured to pump at a flow rate that keeps the gas circulating through the system 100 while permitting the alkali vapor to be used for its intended purpose in the action chamber 110.

The pump 118 can also be utilized to increase/decrease pressure at key locations of the loop so as to force condensation or evaporation of a particular gas species within the gas mixture and support trapping of particular species within the gas mixture. The increase or decrease of pressure in particular locations may be accomplished by implementing restrictions at locations in the loop so that a local lower or higher pressure results when the pump speed is modified thereby producing modified local flow rates. The localized lower or higher pressure induces condensation or evaporation at the particular locations.

Figure 2:
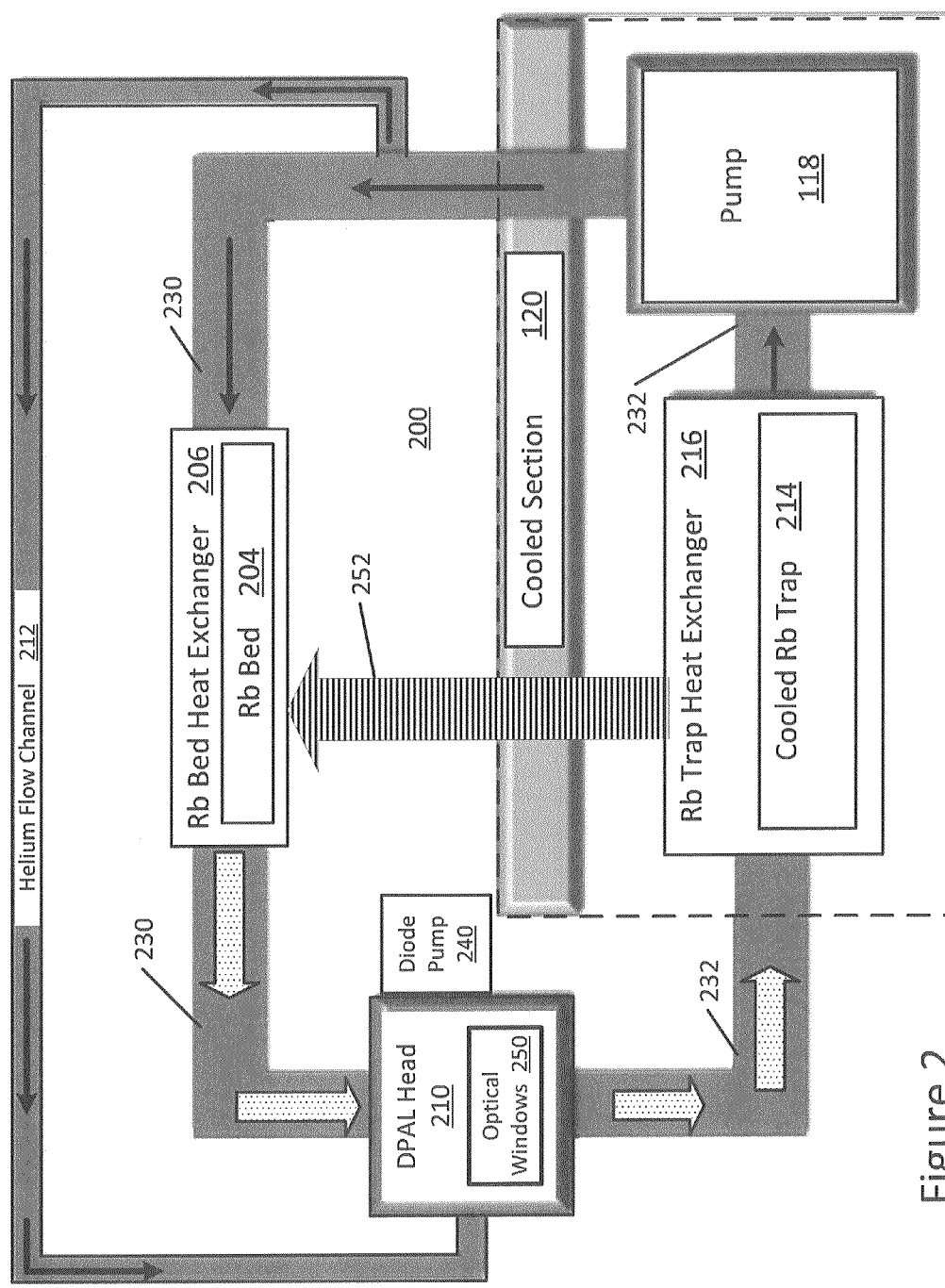
FIG. 2 is a block diagram illustrating operation of an example of a closed-loop alkali vapor circulating system used in an alkali laser.

The alkali vapor circulating system 100 in FIG. 1 also includes an optional buffer gas flow channel 112 for transporting clean buffer gas (that is, buffer gas without alkali vapor) directly to the action chamber 110. The buffer gas flow channel 112 receives clean buffer gas from the infuser transport channel 130 at a point between the pump 118 and the alkali metal source 104. The clean buffer gas flows through the buffer gas flow channel 112 directly to the action chamber 110 to be used in a predetermined manner. One example use is illustrated in FIG. 2 and described below. The flow of the buffer gas in the buffer gas flow channel 112 may be controlled by the pump 118 so as to maintain the system a closed loop. No external source of buffer gas is needed as an amount needed to assist the flow of alkali vapor in the system 100 and to bypass the alkali metal source 104 for use in the action chamber 110 may cycle through the system 100 in a closed loop.

FIG. 2 is a block diagram illustrating operation of an example of a closed-loop alkali vapor circulating system 200 used in an alkali laser. The system 200 in FIG. 2 includes a rubidium ("Rb") wick or bed 204, an Rb bed heat exchanger 206, an Rb trap 214, and an Rb trap heat exchanger 216. The Rb bed 204 is an example implementation of the alkali metal source 104 in FIG. 1. The Rb bed 204 is used for implementation of an Rb DPAL. The Rb bed heat exchanger 206 is an example implementation of the alkali source heat exchanger 106 in FIG. 1. The Rb trap 214 is an example implementation of the cooled alkali metal vapor trap 114. The Rb trap heat exchanger 216 is an example implementation of the trap heat exchanger 116 in FIG. 1.

The alkali vapor circulating system 200 includes a pump 118 configured to pump a buffer gas through an infuser transport channel 230. The buffer gas in the example implementation in FIG. 2 is helium, although any suitable gas that is inert in the presence of Rb or other alkali metals may be used as well. The pump 118 may be configured as described with reference to FIG. 1. The helium flows into the infuser transport channel 230 so that the Rb bed 204 is exposed to the helium. The Rb bed 204 is heated by the Rb bed heat exchanger 206 and emits an Rb vapor that combines with the helium flowing by the Rb bed 204. It is noted that the term "combined" as used herein refers to the mixture of the gases in the space without any chemical reaction between the two.

The alkali vapor and helium combination is transported via the infuser transport channel 230 to an alkali laser head 210, which comprises a laser pump apparatus 240 and a pair of optical windows 250. The alkali laser head 210 receives the alkali vapor (Rb) and buffer gas (helium) combination from the infuser transport channel 230 and contains the combination for use as a gain medium of the alkali laser. The alkali laser head 210 is subject to the flow caused by the pump 118 through the infuser transport channel 230. Accordingly, the Rb and helium combination continues to flow even as it operates as the laser gain medium into a diffuser transport channel 232.

The laser pump apparatus 240 provides an optical pump to the Rb alkali vapor when the Rb and helium combination is contained in the alkali laser head 210. The laser head 210 includes an optical resonator (not shown) around a pair of optical windows 250. In an example implementation, the laser pump apparatus 240 is a diode laser selected to provide the desired laser effect. It is noted that operation of the laser pump apparatus 240 may be as any other DPAL and may be implemented using any suitable optical pumping device.

The Rb and helium combination flows into the diffuser transport channel 232 towards the cooled section 120 of the circulating system 200. The cooled section 120 in the example in FIG. 2 includes the Rb trap 214, and the Rb trap heat exchanger 216. The Rb trap heat exchanger 216 cools the Rb vapor and helium combination flowing in the diffuser transport channel 232.

The Rb trap 214 is positioned in thermal proximity to the Rb trap heat exchanger 216 and collects the Rb condensate as the Rb and helium combination is cooled by the Rb trap heat exchanger 216. The diffuser transport channel 232 extends beyond the Rb trap 214 to provide an inflow of buffer gas without Rb to the pump 118.

The alkali vapor circulating system 200 in FIG. 2 includes a helium flow channel 212 connected to receive clean helium (that is, helium without any Rb vapor) from the infuser transport channel 230 at a position between the pump 118 and the Rb bed heat exchanger 206. The helium flow channel 212 bypasses the Rb bed 204 and is connected to deliver clean helium to the DPAL laser head 210. The helium is flowed into the laser head 210 in a manner that forms gas curtains over the optical windows 250. The helium flow channel 212 may comprises multiple gas lines each adapted to provide clean helium to corresponding optical windows.

The helium flow channel 212 advantageously provides the clean helium to the DPAL laser head 210 as part of the closed loop gas circulating system. No external source of helium or need to dispose of any helium is required.

The vapor circulating system 200 in FIG. 2 also includes an optional exchange wick 252 that may be used to transport Rb from the Rb trap 214 to the Rb bed 204. In this way, the Rb bed 204 is maintained supplied with sufficient Rb to provide continuous operation. The exchange wick 252 is optional in examples in which the supply of Rb may be sufficient to cover all required mission times. For example, the low density of the alkali metal in a typical DPAL results in relatively slow transport rates. The exact numbers will depend on the system parameters (flow rate, temperature, pressure, etc.), which may be adjusted via the closed loop vapor circulating system 200 as described herein. Under certain conditions it may take tens of hours for one gram of rubidium to flow through the system 200. This amount of time may be typically sufficient for adequate use before having to reload the system 200 with more rubidium. In one example implementation described below with reference to FIG. 6, the reloading of the system 200 may proceed by exchanging the Rb bed 204 and Rb trap 206.

As noted above, the pump 118 determines the flow rate for the buffer gas as well as the alkali vapor through the system cycle. The pump 118 may be specified by determining the required flow rate, which depends on the expected pressure drop through the loop. The expected pressure drop may be determined using manufacturers' data, standard formulas for losses in pipe flow, and computational modeling. The pump 118 may be any type of pump. In an example implementation, the pump 118 is implemented using a centrifugal blower. In any given implementation, the pump 118 should be capable of pumping inert gases, such as helium. The materials comprising the pump 118 should also be as non-reactive to alkali metals as possible. Aluminum, stainless steel, and other similar metals may be used for the pump 118 in any given implementation.

Figure 3:
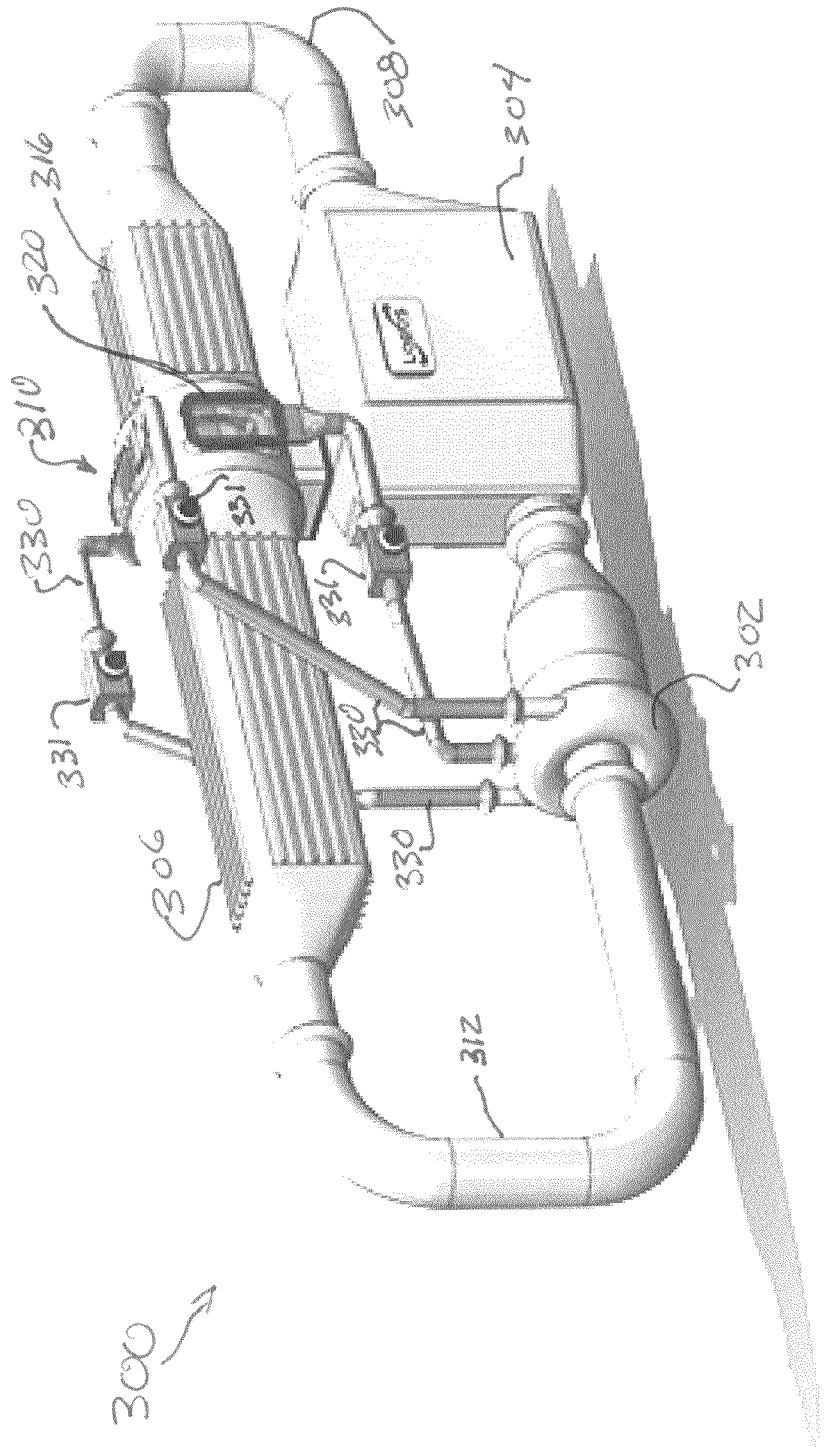
FIG. 3 is a perspective view of an example implementation of the alkali vapor circulating system illustrated in FIG. 2.

FIG. 3 is a perspective view of an example implementation of the alkali vapor circulating system 300 illustrated in FIG. 2. The alkali vapor circulating system 300 in FIG. 3 is used to provide an alkali metal vapor as a gain medium in a DPAL. The alkali vapor circulating system 300 includes a pump 302, an alkali trap/heat exchanger ("trap/HX") 304, an infuser chamber 306, a diffuser transport channel 308, a DPAL laser head 310, an infuser transport channel 312, and a diffusion chamber 316. The infusion transport channel 308 and the diffusion transport channel 312 form transport pipes for flowing the alkali vapor and buffer gas through the cycle. The channels may be constructed out of stainless steel, aluminum, titanium, or any other suitable material that does not react with any of the gases or metal vapor it transports. The alkali trap/HX 304, infusion chamber 306, and diffusion chamber 316 may each be contained within corresponding housings that may also be made of stainless steel, aluminum, titanium, or other suitable material.

The alkali vapor circulating system 300 in FIG. 3 includes a buffer gas flow channel implemented as a plurality of buffer gas lines 330 extending to the alkali laser head 310. Each buffer gas line 330 extends from the pump 302 gas exit portion to terminate at a corresponding one of a plurality of optical windows 320 on the alkali laser head 310 to form gas curtains at the corresponding optical windows 320. Each of the plurality of buffer gas lines 330 includes a controllable valve 331 configured to meter the buffer gas flow in each buffer gas line 330 in response to a controller (not shown).

Figure 4:
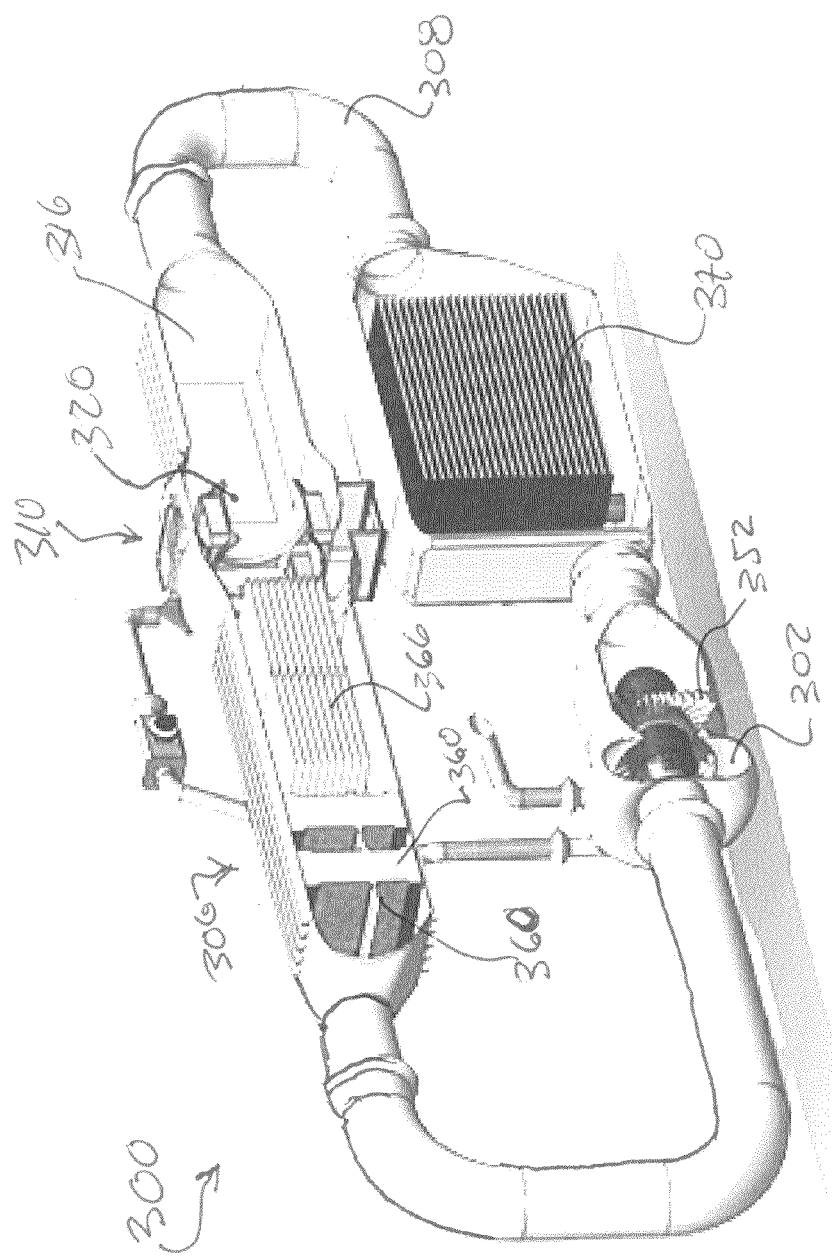
FIG. 4 is a perspective view of the system of FIG. 3 with selected portions of the system cut away to reveal selected components.

FIG. 4 is a perspective view of the system 300 of FIG. 3 with selected portions of the system 300 cut away to reveal selected components. As shown in FIG. 4, the infusion chamber 306, the diffusion chamber 316, the pump 302, and the alkali trap/HX 304 are each cut in a cross-section. The infusion chamber 306 includes an alkali wick or bed/heat exchanger ("bed/HX") 360 at an end of the infusion chamber 306 where the buffer gas enters the infusion chamber 306. The alkali bed/HX 360 may be a single component comprising a heat exchange component and an alkali metal source. The heat exchange component is thermally coupled to the alkali source to vaporize the alkali. The buffer gas flows through the space surrounding the alkali bed 360 that contains the vaporized alkali metal. The buffer gas, which now contains the vaporized alkali metal continues to flow in the infusion chamber 306 through a flow conditioning device 366. The flow conditioning device 366 comprises flow shaping components disposed to smooth out, or reduce turbulence, in the flow of alkali vapor and buffer gas as it enters the DPAL laser head 310. An example flow conditioning device 366 is described below with reference to FIG. 7.

The alkali vapor and buffer gas exit the DPAL laser head 310 into the diffusion chamber 316. The diffusion chamber 316 is illustrated as being a space with a cross-sectional area that is greater than that of the infusion transport channel 308. The geometry of the diffusion chamber 316 may be modified in order to enhance or limit cooling of the alkali vapor and buffer gas exiting the DPAL laser head 310.

The alkali trap/HX 304 includes an alkali trap with a heat exchanger 370 that transfers thermal energy from the alkali vapor and buffer gas entering from the diffusion transport channel 308. The alkali vapor and buffer gas flow through spaces within the alkali trap with a heat exchanger 370. As the alkali vapor and buffer gas pass the alkali trap with a heat exchanger 370, the cooled alkali vapor condenses onto the trap part of the alkali trap with a heat exchanger 370. The buffer gas then continues to pass through without the alkali vapor, which is condensing on the trap. The buffer gas exits cleanly (without alkali vapor) and flows toward the pump 302.

The pump 302 is cut at a cross-section to show the impeller blades 352 for an axial flow impeller implemented in the system 300. The pump 302 is configured in FIG. 3 to provide clean buffer gas to the DPAL laser head 310 via three buffer transport lines 330, which exit the pump 302 and extend to the DPAL laser head 310.

Figure 5:
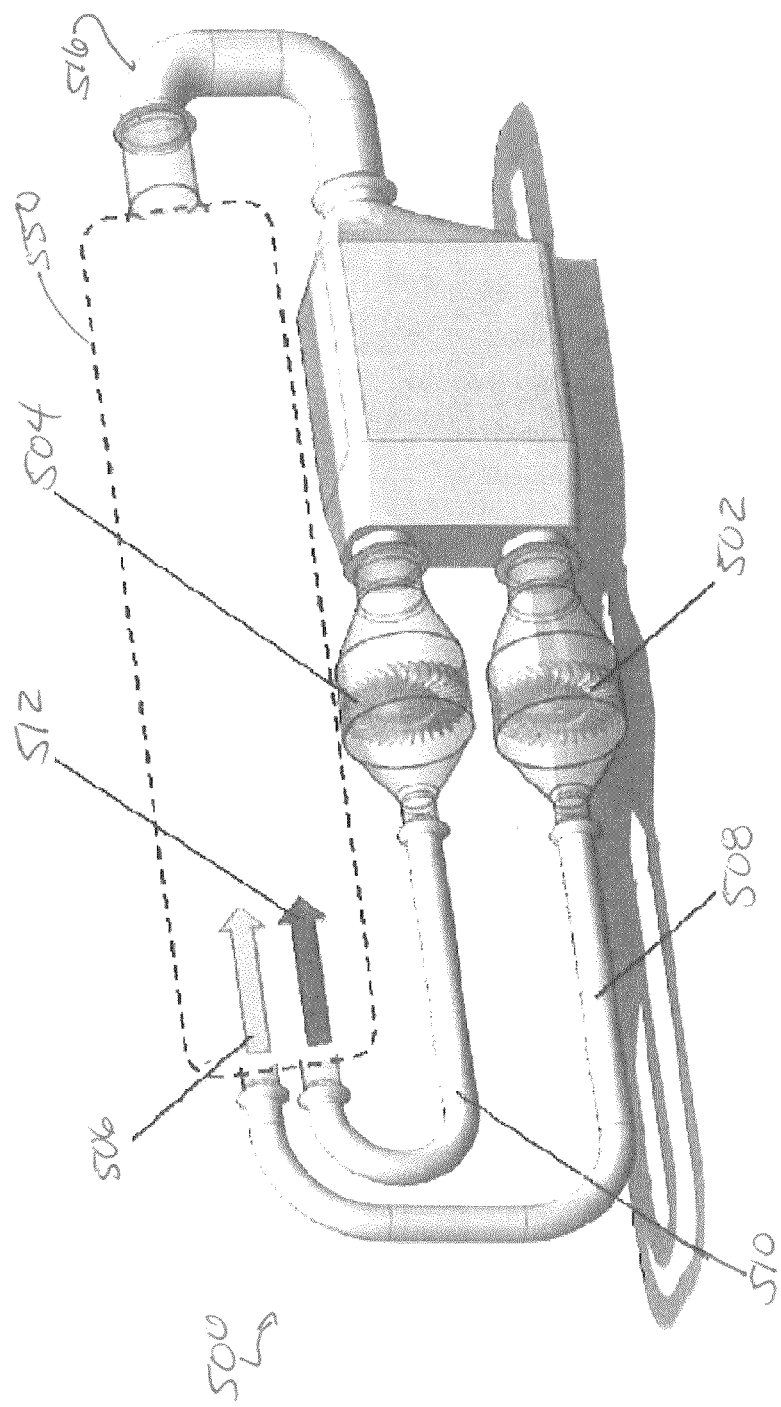
FIG. 5 is a perspective view of another example implementation of an alkali vapor circulating system.

FIG. 5 is a perspective view of another example implementation of an alkali vapor circulating system 500. The alkali vapor circulating system 500 in FIG. 5 includes a pump 502, an infuser transport channel 508, and a diffuser transport channel 516. The DPAL laser head, or whatever action chamber is used for this implementation, and the infusion chamber are indicated as a function block 550. The alkali vapor circulating system 500 in FIG. 5 is similar to the system 300 in FIGS. 2 and 3 except that the alkali vapor circulating system 500 in FIG. 5 includes a second pump 504. The second pump 504 receives clean buffer gas from the alkali trap/HX in a manner similar to that of the first pump 502. The first pump 502 flows the clean buffer towards the infusion chamber for combination with the alkali vapor in the infusion chamber. The second pump 504 flows the clean buffer gas through a bypass line 510 to terminate at a component having a function that advantageously uses the clean buffer gas. For example, the bypass line 510 may terminate at a DPAL laser head near an optical window. The alkali vapor circulating system 500 provides the second pump 504 and an independent controller to permit control of the clean buffer gas transport through the bypass line 510 independent of the first pump 502. The independent control of the pumps 502, 504 may allow for further or more fine control of the flow rate through the closed loop system. The independent control may also allow for the use of two different types of pumps.

The use of two independent pumps allows fine-tuning and control of the flow rate of clean gas over the optical windows to create a clean buffer shielding the optical windows while simultaneously allowing fine-tuning and control of the main flow of gas flowing through the apparatus To the limit, the pump dedicated to flow clean gas to buffer the optical windows can be used to cause flow throughout the loop by drag. The two pumps may provide the ability to adjust the clean gas flow buffering the optical windows without directly depending on the flow rate of the gas circulating through the entire loop.

Figure 6:
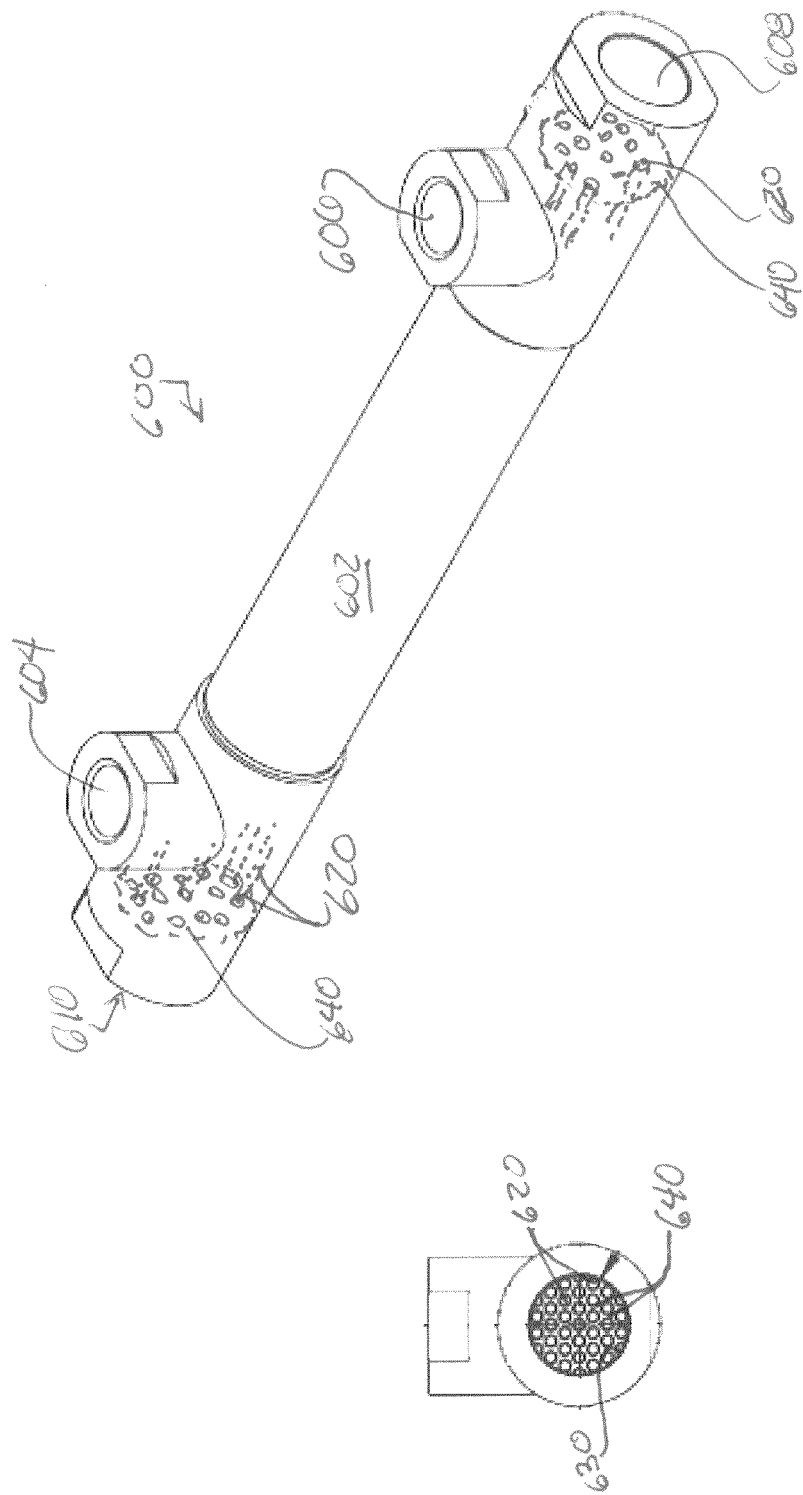
FIG. 6 is a perspective view of an example heat exchanger that may be used in example implementations of a closed-loop vapor circulating system.

As noted above with reference to FIG. 4, the alkali bed and heat exchanger 360 and the alkali trap and heat exchanger 370 may each be integrated as single components. In addition, the components may be exchanged after use in which the alkali supply on the alkali bed of the alkali bed and heat exchanger 360 is exhausted so that it is installed as the alkali trap and heat exchanger 370 and the alkali trap and heat exchanger 370 having a layer of alkali metal deposited on it after use is installed as the alkali bed and heat exchanger 360. The heat exchanger function would be interchangeable as well, which may depend on the heat transfer fluid selected for each component. FIG. 6 is a perspective view of an example bed/trap plus heat exchanger component 600 that may be exchanged in example implementations of a closed-loop vapor circulating system.

The bed/trap plus heat exchanger component 600 may be a tube-in-shell heat exchanger comprising a plurality of flow tubes 620 in a housing 602 having a substantially cylindrical shape. The bed/trap plus heat exchanger component 600 includes a thermal transfer fluid input port 604 and exit port 606 as well as a buffer gas input port 608 and output port 610. A first tubing plate 640 is positioned between the thermal transfer fluid input port 604 and the buffer gas output port 610; and a second tubing plate 640 is positioned between the thermal transfer fluid output port 606 and the buffer gas input port 608. The tubing plates 640 provide a seal for a plurality of smaller flow tubes 620 flowing between the plates 640. The bed/trap plus heat exchanger component 600 may be configured to input a heating, or cooling, fluid at the fluid input port 604 while buffer gas flows into the buffer gas input port 608. The buffer gas flows into the flow tubes 620 formed at the plate 640.

Where the bed/trap plus heat exchanger component 600 is configured to operate as a bed/heat exchanger, the heating fluid input port 604 may input a heating fluid. In addition, a bed or layer of alkali metal may be formed on an inner surface 630 of the flow tubes 620. As the heating fluid flowing between the housing 602 and the outside surface of flow tubes 620 heats the space within the flow tubes 620, the alkali layer in the flow tubes 620 is vaporized. The alkali vapor is entrained with the buffer gas as the buffer gas flows through input port 608 through the tubes 620 and out through the alkali vapor and buffer gas output port 610. The bed/trap plus heat exchanger component 600 may be alternatively configured, wherein the bed or layer of alkali metal may be formed on an outer surface of the flow tubes 620 and the inner surface of the housing 602. In this embodiment the heat exchanger component 600 may be configured such that the heating fluid and not the buffer gas is input via input port 608. Similarly, the buffer gas may be alternately input via the fluid input port 604. As such, the heating fluid may be configured to flow through the flow tubes 620 heating the space between the outer surface of the flow tubes 620 and the inner surface of the housing 602. As the space between the outer surface of the flow tubes 620 and the inner surface of the housing 602 is heated the alkali layer is vaporized. The alkali vapor is entrained with the buffer gas as the buffer gas flows through the space between the outer surface of the flow tubes 620 and the inner surface of the housing 602.

Where the bed/trap plus heat exchanger component 600 is configured to operate as a trap/heat exchanger, the heating fluid input port 604 may input a cooling fluid. In addition, an alkali vapor and buffer gas combination may enter the bed/trap plus heat exchanger component 600 via the heating fluid input port 604. The cooling fluid may be carried in the volume between the housing 602 and the outside surface of the tubes 620 to cool the volume inside of the tubes 620. The cooling fluid cools the alkali vapor and buffer gas causing the alkali vapor to condense inside of tubes 620.

An example implementation may be configured with the alkali bed/HX implemented using a first bed/trap plus heat exchanger component 600 with the layer of alkali metal and buffer gas flowing through its tubes 620. Similarly, the example implementation may include the alkali trap/HX implemented using the second bed/trap plus heat exchanger component 600 with the inner surface of tubes 620 used as a trap and a cooling fluid flowing through the space between the housing 602 and the tubes 620. After a period of time, the first bed/trap plus heat exchanger component 600 may exhaust its alkali metal layer so that it may no longer function as an alkali metal source. Similarly, the second bed/trap plus heat exchanger component 600 may have accumulated a substantial amount of condensed alkali metal. After the period of time, a user may perform maintenance on the system that would include exchanging the first bed/trap plus heat exchanger component 600 and the second bed/trap plus heat exchanger component 600. Once exchanged, the first bed/trap plus heat exchanger component 600 is used as an alkali trap/heat exchanger that collects alkali metal condensed while cooling; and the second bed/trap plus heat exchanger component 600 is used as an alkali bed/heat exchanger that sources alkali metal vapor when heated.

It is noted that the bed/trap plus heat exchanger component 600 described with reference to FIG. 6 is just one example of such a component. Other similar components with different configurations and principles of operation may be used and exchanged as described with reference to FIG. 6.

Figure 7:
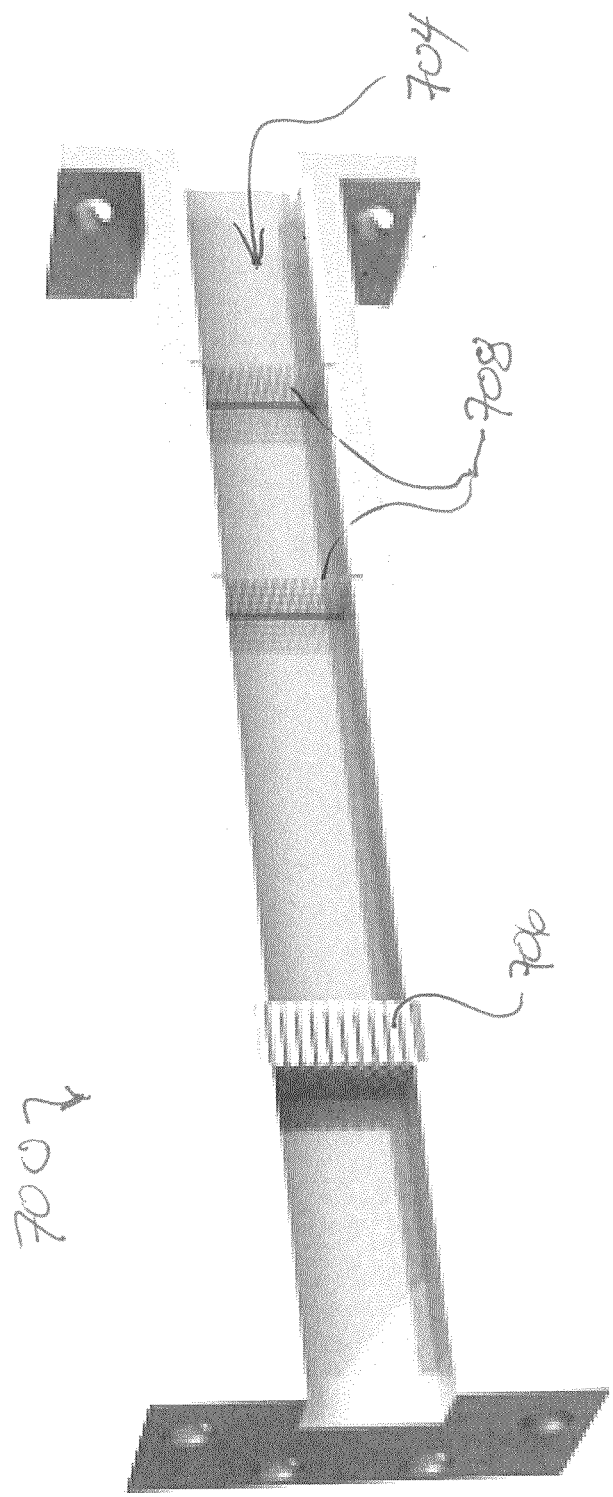
FIG. 7 is a perspective view of an example flow conditioning device that may be used in example implementations of a closed-loop vapor circulating system.

FIG. 7 is a perspective view of an example flow conditioning device 700 that may be used in example implementations of a closed-loop vapor circulating system. The flow conditioning device 700 may be disposed in the infuser transport channel 230 (in FIG. 2) between the alkali metal source and the alkali laser head to condition the flow of alkali vapor gas and buffer gas to be smooth and uniform within the alkali laser head 210 (in FIG. 2). The flow conditioning device 700 includes a transport channel 702, a vapor alkali and buffer gas combination flow 704, a first flow conditioner 706, and at least one of a second flow conditioner 708. It is noted that the example shown in FIG. 7 includes the transport channel 302 configured for use in a test system. The flow conditioning device 700 in FIG. 7 comprises at least one of a honeycomb flow path 706, and at least one screen 708 configured to provide a desired laminar flow. The honeycomb 706 consists of an array of small flow channels with particular channel size and length. The screen 708 consists of an a thin mesh made out of a compatible material with >58% open area. These are standard devices and those skilled in the art of flow systems will be able to determine the optimal design for a given set of system parameters.

Figure 8:
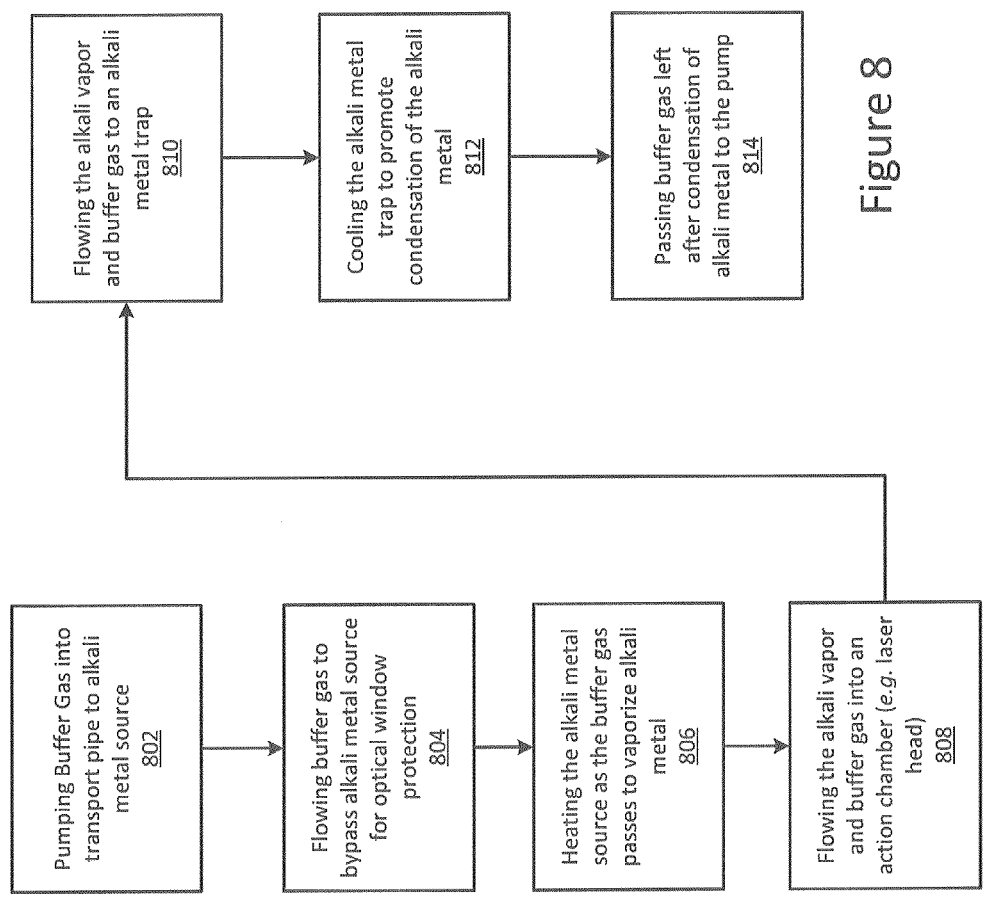
FIG. 8 is a flowchart illustrating operation of example methods for circulating vapor in a closed loop system.

FIG. 8 is a flowchart 800 illustrating operation of example methods for circulating vapor in a closed loop system. The method illustrated in FIG. 8 may be performed using any suitable implementation of a vapor circulating system. Reference to any structure in the description that refers to FIG. 8 shall be understood to refer to structure described above with reference to FIG. 1 unless stated otherwise.

In the method illustrated by the flowchart 800 in FIG. 8, a buffer gas is pumped in to the infusion transport channel 130 (FIG. 1) as indicated in Step 802. Buffer gas may be guided to a buffer gas channel 112 that bypasses the alkali metal source and flows directly to, for example, an optical head to form gas curtains at the optical windows as indicated in Step 804. At Step 806, the alkali metal is heated and vaporized in a space that exposes the alkali metal to the gas buffer. to flow with the gas buffer. At step 808, the exposure of the alkali metal with the gas buffer allows the alkali vapor to flow with the gas buffer towards an action chamber. An example of an action chamber as discussed above is a DPAL laser head. At step 810, the alkali vapor and buffer gas continue to flow to an alkali metal vapor trap. The alkali metal vapor trap is cooled as indicated in Step 812 to condense the alkali metal on the metal vapor trap. At step 814, the buffer gas is passed clean, without alkali vapor, to a pump. The pump is configured to provide a flow of buffer gas that controls the flow of alkali vapor and buffer gas through the entire cycle.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

What is claimed is:

1. A system for circulating a metal vapor, the system comprising:

a pump configured to pump a buffer gas through an infuser transport channel;

a metal source disposed in the infuser transport channel for exposure to the buffer gas;

a source heat exchanger configured to be thermally coupled to the metal source to produce a metal vapor to combine with the buffer gas;

an action chamber comprising an optical window, and disposed to receive the metal vapor and buffer gas combination from the infuser transport channel for a function that uses the metal vapor, and to flow the metal vapor and buffer gas combination into a diffuser transport channel;

a metal vapor trap heat exchanger configured to be thermally coupled to the metal vapor and buffer gas combination flowing in the diffuser transport channel;

a metal vapor trap disposed in the diffuser transport channel in thermal proximity to the metal vapor trap heat exchanger, the metal vapor trap configured to collect metal condensate as the metal vapor and buffer gas combination is cooled, where the diffuser transport channel extends beyond the metal vapor trap to provide an inflow of buffer gas without metal vapor to the pump, and where the pump is configured to provide a circulating gas flow through the infuser transport channel, the action chamber, and the diffuser transport channel; and a buffer gas flow channel connected at one end to the infuser transport channel between the pump and the metal source to receive the buffer gas without the metal vapor, the buffer gas flow channel connected at another end to the action chamber to flow the buffer gas without the metal vapor directly into the action chamber so as to form a gas curtain along the optical window of the action chamber.

2. The system of claim 1 where the action chamber is a laser head, the system further comprising:

a laser pump apparatus configured to pump the metal vapor as a gain medium for a metal vapor laser.

3. The system of claim 2 where the laser pump apparatus is a laser diode.

4. The system of claim 1 where the buffer gas is any one or combination of helium, methane, ethane, argon, neon, xenon, or krypton.

5. The system of claim 1 where the metal source comprises any one of rubidium ("Rb"), lithium ("Li"), sodium ("Na"), potassium ("K"), cesium ("Cs"), francium ("Fr"), or copper ("Cu").

6. The system of claim 1 further comprising:
a flow conditioning device disposed in the infuser transport channel between the metal source and the action chamber to condition the flow of metal vapor gas and buffer gas to be smooth and uniform within the action chamber.

7. The system of claim 6 where:
the flow conditioning device comprises at least one of a honeycomb flow path or at least one screen.

8. The system of claim 1 where:
the pump is any of a centrifugal blower, an axial flow impeller, a rotary pump, a centripetal pump, or a positive displacement pump.

9. The system of claim 1 wherein:
the source heat exchanger comprises a plurality of heating tubes disposed inside a first housing of a first tube-in-shell heat exchanger, where the plurality of heating tubes are configured to transport a heat transfer fluid;
the metal source is a layer of metal on a first inner surface of the first housing of the first tube-in-shell heat exchanger and a first outer surface of the heating tubes;
the metal vapor trap heat exchanger is a plurality of cooling tubes disposed inside a second housing of a second tube-in-shell heat exchanger, where the plurality of cooling tubes are configured to transport a heat transfer fluid; and
the metal vapor trap is a second inner surface of a second housing of a second tube-in-shell heat exchanger.

10. The system of claim 1 further comprising:
a metal exchange wick between the metal vapor trap and the metal source to transfer metal collected by the metal vapor trap to the metal source.

11. The system of claim 1 where the buffer gas flow channel comprises a plurality of buffer gas lines extending to the action chamber, each buffer gas line terminating at a corresponding one of a plurality of optical windows on the action chamber to form gas curtains at the corresponding optical windows.

12. The system of claim 11 where the buffer gas lines comprise controllable valves configured to monitor the buffer gas flow in each buffer gas line in response to a controller.

13. The system of claim 1 where the pump is a first pump, the system further comprising:
a second pump disposed to receive buffer gas without metal vapor from the diffuser transport channel and to flow buffer gas into the buffer gas flow channel.

14. The system of claim 1 where the action chamber is a test section for performing tests or measurements of metal vapor characteristics or of materials to be used in action chambers, where the system operates as a test system for testing designs of systems using metal vapors.

15. A metal vapor laser comprising:
a pump configured to pump a buffer gas through an infuser transport channel;
a metal source disposed in the infuser transport channel for exposure to the buffer gas;
a source heat exchanger configured to heat the metal source to produce a metal vapor to combine with the buffer gas;
a laser head comprising an optical window, the laser head disposed to receive the metal vapor and buffer gas combination from the infuser transport channel, to contain the metal vapor and buffer gas combination as a gain medium of the metal laser, and to flow the metal vapor and buffer gas combination into a diffuser transport channel;
a laser pump apparatus configured to pump the metal vapor when the metal vapor and buffer gas combination is contained in the laser head to generate a laser light through the optical window;
a metal vapor trap heat exchanger configured to cool the metal vapor and buffer gas combination flowing in the diffuser transport channel;
a metal vapor trap disposed in the diffuser transport channel in thermal proximity to the metal vapor trap heat exchanger, the metal vapor trap configured to collect metal condensate as the metal vapor and buffer gas combination is cooled, where the diffuser transport channel extends beyond the metal vapor trap to provide an inflow of buffer gas without metal vapor to the pump, and where the pump is configured to provide a circulating gas flow through the infuser transport channel, the laser head, and the diffuser transport channel; and
a buffer gas flow channel connected at one end to the infuser transport channel between the pump and the metal source to receive the buffer gas without the metal vapor, the buffer gas flow channel connected at another end to the action chamber to flow the buffer gas without the metal vapor directly into the laser head so as to form a gas curtain along the optical window of the action chamber.

16. The metal vapor laser of claim 15 where the laser pump apparatus is a laser diode.

17. The metal vapor laser of claim 15 where the buffer gas is any one or combination of helium, methane, ethane, argon, neon, xenon, or krypton.

18. The metal vapor laser of claim 15 where the metal source comprises any one of rubidium ("Rb"), lithium ("Li"), sodium ("Na"), potassium ("K"), cesium ("Cs"), francium ("Fr"), or copper ("Cu").

19. The metal vapor laser of claim 15 further comprising:
a flow conditioning device disposed in the infuser transport channel between the metal source and the laser head to condition the flow of metal vapor gas and buffer gas to be smooth and uniform within the laser head.

20. The metal vapor laser of claim 19 where:
the flow conditioning device comprises at least one of a honeycomb flow path or at least one screen.

21. The metal vapor laser of claim 15 where:
the pump is any of a centrifugal blower, an axial flow impeller, a rotary pump, a centripetal pump, or a positive displacement pump.

22. The metal vapor laser of claim 15 where:
the source heat exchanger comprises a plurality of heating tubes disposed inside a first housing of a first tube-in-shell heat exchanger, where the plurality of heating tubes are configured to transport a heat transfer fluid;
the metal source is a layer of metal on a first inner surface of a first housing of a first tube-in-shell heat exchanger;
the metal vapor trap heat exchanger is a plurality of cooling tubes disposed inside a second housing of a second tube-in-shell heat exchanger, where the plurality of cooling tubes are configured to transport a heat transfer fluid; and the metal vapor trap is a second inner surface of a second housing of a second tube-in-shell heat exchanger.

23. The metal vapor laser of claim 15 further comprising:
a metal exchange wick between the metal vapor trap and the metal source to transfer metal collected by the metal vapor trap to the metal source.

24. The metal vapor laser of claim 15 where the buffer gas flow channel comprises a plurality of buffer gas lines extending to the laser head, each buffer gas line terminating at a corresponding one of a plurality of optical windows on the laser head to form gas curtains at the corresponding optical windows.

25. The metal vapor laser of claim 15 where the plurality of buffer gas lines include controllable valves configured to monitor the buffer gas flow in each buffer gas line in response to a controller.

26. The metal laser of claim 15 where the pump is a first pump, the metal vapor laser further comprising:
a second pump disposed to receive buffer gas without metal vapor from the diffuser transport channel and to flow buffer gas into the buffer gas flow channel.

27. A method for protecting optical windows in a laser comprising:
pumping buffer gas into an infuser transport channel;
passing the buffer gas over an metal source;
heating the metal source to vaporize metal as the buffer gas passes over the metal source;
flowing the metal vapor and buffer gas from the infuser transport channel into an action chamber;
flowing the metal vapor and buffer gas from the action chamber to a metal vapor trap via a diffuser transport channel;
cooling the metal vapor trap to condense the metal on a metal vapor trap;
passing buffer gas without metal to the pump for circulating the buffer gas; and
flowing a portion of the buffer gas without metal vapor via a buffer gas flow channel to the action chamber so as to form a gas curtain over an optical widow of the action chamber, wherein the buffer gas flow channel is connected at one end to the infuser transport channel between the pump and the metal source to receive the buffer gas without the metal vapor and the buffer gas flow channel is connected at the other end to the action chamber.

28. The method of claim 27 where the action chamber is a laser head configured to contain the metal vapor and buffer gas as a gain medium for metal vapor laser, the method further comprising:
pumping the gain medium by lighting the alkali vapor using a laser pump apparatus; and
emitting an alkali laser light via the optical window.

29. The method of claim 27 further comprising:
conditioning the flow of the metal vapor and buffer gas prior to entering the action chamber to reduce turbulence.

30. The method of claim 27, where the metal source comprises any one of rubidium ("Rb"), lithium ("Li"), sodium ("Na"), potassium ("K"), cesium ("Cs"), francium ("Fr"), or copper ("Cu").

* * * * *